May 25, 1954     T. J. MILLER     2,679,128
ROTARY DISK PLATEN
Original Filed July 19, 1945
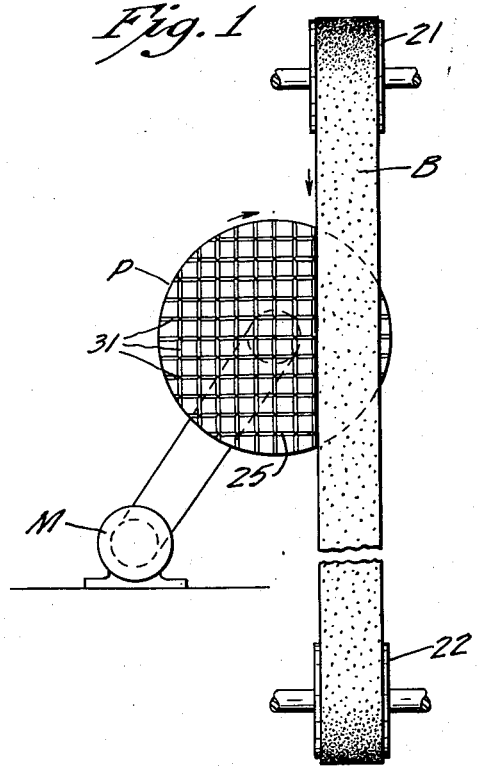
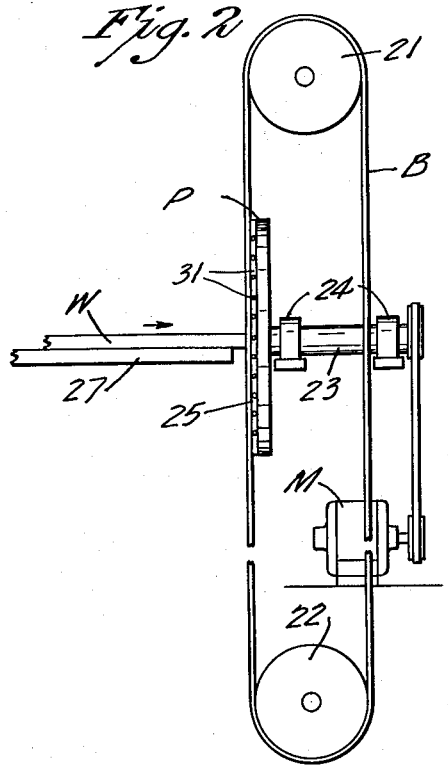
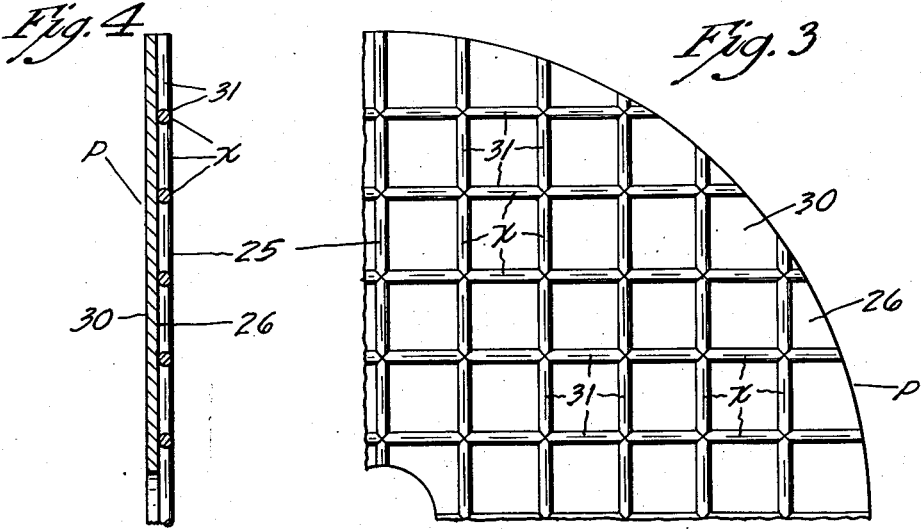

Patented May 25, 1954

2,679,128

UNITED STATES PATENT OFFICE 2,679,128

ROTARY DISK PLATEN

Theodore J. Miller, St. Paul, Minn., assignor to Minnesota Mining & Manufacturing Company, St. Paul, Minn., a corporation of Delaware Original application July 19, 1945, Serial No. 605,962, now Patent No. 2,586,848, dated February 26, 1952. Divided and this application February 23, 1951, Serial No. 212,223

8 Claims. (Cl. 51—141)

This invention relates to supports or anvil members or platens for use in backing up or supporting sheet abrasives at the point where the workpiece being abraded contacts the abrasive coated side of the abrasive sheet during an abrading operation.

It is particularly applicable to "belt sanding" or "belt grinding," i. e., to abrading operations in which an abrasive belt or strip is employed, and the invention is accordingly illustrated in the present disclosure in connection with belt sanding apparatus.

A belt sanding apparatus usually comprises an endless abrasive belt mounted on two or more pulleys, and means for continuously driving the belt. Abrading operations with such apparatus may be divided roughly into two classifications, namely, unsupported operations and supported operations. An unsupported operation is where there is no support back of the belt at the point of contact with the work other than the tension of the belt that is applied between the adjacent pulleys or guides, whereas a supported operation is where there is.

The present invention relates to the latter type of operation, i. e., to supported operations.

In the said supported type of operations there are at least two principal types or classes of supports. One is a wheel or pulley, usually one of the driving or idling pulleys around which the endless belt is mounted, the peripheral surface of the pulley being employed to bear against the work. This is sometimes referred to as a roll or line contact support, and is particularly suited for spot grinding and other precision work such as surface grinding. The second type of support is an anvil member or platen, usually substantially flat, which is applied to a span of the belt between two of the pulleys, and it is to this second or platen type of support that the present invention relates.

Heretofore the flat platen method of support has caused a decided drop in the efficiency of the belt long before the mineral on the belt is worn down or abraded off. This was due largely to a filling and glazing of the belt which developed rapidly early in the life of the belt so that only the tops of the highest particles ever came into full use. Some attempts were made to improve this situation, including the use of irregular surfaced platens but whatever improvement these may have produced in the way of lengthened belt life, was offset by an increased wearing or "hollowing" of the platen face.

Nevertheless, because of its peculiar adaptability to certain types of grinding operations, flat platen belt grinding must of necessity be used and it is therefore an objective of this invention to provide a platen or suitable supporting element for flat belt grinding which will provide inter alia (1) longer belt life, (2) faster cutting and (3) retention by the platen of its flat surface.

The present invention does indeed meet these and other objectives and solve these and other problems successfully, and, in its illustrated aspect comprises a belt-supporting platen having a generally planar working surface or "face" mounted adjacent the back of a span of the belt with the platen face substantially parallel thereto and means for moving the platen face during an abrading operation in a path substantially parallel to the belt span.

According to the present invention, the motion of the platen is effected by providing a platen in the form of a disc and then rotating it. The face of the disc platen is discontinuous or broken. It may be broken in a variety of patterns, the irregularities or breaks being such as to provide alternate areas of support and non-support for the belt so as to produce what may be termed a "line contact" between the belt and the work.

The disc platen described hereinafter and illustrated in the accompanying drawings exemplifies alternative forms of the disc platen broadly described and claimed in my copending application Serial No. 605,962, filed July 19, 1945, which issued as Patent No. 2,586,848, on February 26, 1952, and of which the present application is a division.

Figure 1 is a schematic view (front) of a belt sanding apparatus employing a rotary disc platen made in accordance with the present invention;

Figure 2 is a side view of the apparatus of Figure 1, showing a workpiece being abraded;

Figure 3 is a front elevation of a fragment of the platen; and

Figure 4 is a side elevation of the fragment.

Figures 1 and 2 show a belt sanding apparatus comprising an endless abrasive belt B mounted on rotatable pulleys 21 and 22, means, such as an electric motor (not shown), for rotating the pulleys so as to drive the belt, and an anvil or supporting member or platen in the form of a disc P rotatably mounted, by means of a shaft 23 and bearings 24, adjacent the back of a span of the belt with the outer working surface 25 of the disc P substantially parallel to the span.

The disc platen P comprises a planar surfaced disc base 30 carrying on its surface a plurality of outwardly extending ridges 31 in spaced relation to each other, the outer portions of the ridges together forming a composite surface of substantially planar contour which constitutes the outer or working surface 25 of the platen. The ridges 31 may be of any shape in cross-section. Here they are circular, being rods that are cut and welded to the base 30 to form square "depressions" or spaces 26 between them, the rods themselves forming at once impact "edges" x and the platen face or working surface 25.

As an object such as the workpiece W on the work support 27, is pressed against the moving belt B so as to be abraded thereby, the belt is pressed against the rotary platen P, and the portion of the belt that is opposite a depression 26 (and is thus unsupported) is thereby forced to yield slightly in a direction inwardly into the depression whereas the portion of the belt that contacts a ridge 31 (the platen face 25), and is thus supported, does not so yield, so that the belt is bent slightly and there is formed, in effect a temporary ridge or bump in the belt in conformity to the contour of the edge x. This causes what may, for convenience, be termed a "line contact" between the belt and the workpiece, as contrasted with the flat or "surface contact" that results from continuous or smooth surfaced platens, the "line" being the "impact ridge" or bump in the belt which conforms in length, direction, etc., approximately to the edge x. There is consequently produced an impact together with an increase in pressure per unit area between the belt and the work, which causes the belt to cut at each impact much more than when there is simply a sliding frictional contact over a broad area between the surface of the belt and the surface of the work. The line contact thus produces faster cut. It also produces longer belt life because the bending of the belt "opens it up," breaks up any glaze that has formed, exposes fresh unused portions of the mineral particles and results in keeping the belt at full cutting efficiency until its entire coating of abrasive particles is substantially completely used up. There is substantially no waste mineral.

The depressions 26 may take a wide variety of shapes, sizes, angles, frequency of occurrence, etc.

The movement of the belt B in contact with the platen P causes the latter to rotate; or, rotation may be effected by suitable driving means such as the electric motor M.

The cutting efficiency increases as the linear speed of the rotating disc platen approaches that of the belt, and substantially beyond that. Its movement may be in the same direction as that of the belt or it may be in the reverse direction.

One very advantageous result of the rotation of the platen is to distribute the pressure and the consequent wear of the platen face throughout its working area, thereby preserving the desired overall planar profile of the working surface of the platen for a very substantial period of time, as contrasted with the rapid localized hollowing of stationary platens. The latter commonly need replacement in a few hours, whereas rotary platens made in accordance with my invention have been known to run for several months without variation in the flatness of the working surface.

The ridged type disc platen here shown is particularly suitable for very fast and very rough abrading or cutting. The pressure per square inch between the belt and the workpiece is relatively high in relation to the relatively small total contact area. Within certain limits there is a direct inverse relationship between contact area and cutting speed.

It will be seen that sanding platens made in accordance with my invention possess numerous important and valuable advantages over those heretofore known, including (1) longer life of the platen and retention by the working portion of its exterior surface of the desired overall planar contour or flatness, due to the movement of the platen; (2) lower or cooler abrading temperatures due to numerous factors, including reduced friction, the faster cut and the movement of the platen; (3) longer life of the abrasive sheet due to numerous factors including the cooler abrading temperature and the fact that substantially all of the abrasive coating is rendered usable by the "opening up" effect of the platen's impact edges; and (4) faster cut, due to numerous factors including the broken-surface feature and the unique effect of a rotating disc platen.

The invention is not to be understood as restricted to the details set forth since these may be modified within the scope of the appended claims without departing from the spirit and scope of the invention.

I claim:

1. In a belt sanding apparatus which comprises an endless abrasive belt and means for continuous propulsion thereof, a belt-supporting platen comprising a rotatably mounted disc carrying on its surface a plurality of outwardly extending ridges in spaced relation to each other, the outer portions of the ridges together forming a composite outer platen surface of substantially planar contour, the disc being positioned with its said composite surface adjacent the back of a span of the belt and substantially parallel thereto.

2. In a belt sanding apparatus which comprises an endless abrasive belt and means for continuous propulsion thereof, a belt-supporting platen comprising a rotatably mounted disc carrying on its surface a plurality of outwardly extending ridges which are positioned in spaced relation to each other to form depressions between them, the outer portions of the ridges together forming a composite outer platen surface of substantially planar contour, the disc being positioned with its said composite surface adjacent the back of a span of the belt and substantially parallel thereto.

3. The device of claim 2 in which the depressions are square.

4. In a belt sanding apparatus which comprises an endless abrasive belt and means for continuous propulsion thereof, a belt-supporting platen comprising a rotatably mounted disc and a plurality of rods fixed to the face of the disc in spaced relation to each other to form outwardly extending ridges with depressions between them, the outer portions of the ridges together forming a composite outer platen surface of substantially planar contour, the disc being positioned with its said composite surface adjacent the back of a span of the belt and substantially parallel thereto.

5. The device of claim 4 in which the depressions are square.

6. In a belt sanding apparatus which comprises an endless abrasive belt and means for continuous propulsion thereof, a belt-supporting platen comprising a rotatably mounted disc positioned with a portion of a surface thereof adjacent the back of a span of the belt and substantially parallel thereto, the said portion of the surface being substantially planar with its continuity interrupted by a plurality of square depressions.

7. The device of claim 6 in which the depressions are formed by a plurality of ridges that extend outwardly from the surface of the disc in spaced relation to each other, the outer portions of the ridges together forming a composite outer platen surface of substantially planar contour.

8. The device of claim 7 in which the ridges are rods fixed to the surface of the disc.

References Cited in the file of this patent

UNITED STATES PATENTS

| Number | Name | Date |
| --- | --- | --- |
| 1,036,783 | Bein | Aug. 27, 1912 |
| 1,045,945 | Carney | Dec. 3, 1912 |
| 1,744,807 | Schulte | Jan. 28, 1930 |
| 2,162,279 | Herchenrider | June 13, 1939 |
| 2,292,261 | Albertson | Aug. 4, 1942 |

FOREIGN PATENTS

| Number | Country | Date |
| --- | --- | --- |
| 695,453 | Germany | Aug. 4, 1942 |